United States Patent [19]
Landt

[11] Patent Number: 4,816,839
[45] Date of Patent: Mar. 28, 1989

[54] TRANSPONDER ANTENNA

[75] Inventor: Jeremy A. Landt, Los Alamos, N. Mex.

[73] Assignee: Amtech Corporation, Dallas, Tex.

[21] Appl. No.: 135,048

[22] Filed: Dec. 18, 1987

[51] Int. Cl.$^4$ ............................................... H01Q 9/28
[52] U.S. Cl. ..................................... 343/795; 343/822
[58] Field of Search ................................ 343/795, 822

[56] References Cited

U.S. PATENT DOCUMENTS

| | | | |
|---|---|---|---|
| 3,566,315 | 2/1971 | Vinding | 343/795 |
| 3,728,632 | 4/1973 | Ross | 343/822 |
| 3,887,925 | 6/1975 | Ranghelli et al. | 343/795 |
| 4,001,834 | 1/1977 | Smith | 343/795 |
| 4,067,016 | 1/1978 | Kaloi | 343/795 |
| 4,298,878 | 11/1981 | Dupressoir et al. | 343/795 |
| 4,498,085 | 2/1985 | Schwarzmann | 343/795 |
| 4,573,056 | 2/1986 | Dudôme et al. | 343/822 |
| 4,605,012 | 8/1986 | Ringeisen et al. | 343/795 |

*Primary Examiner*—William L. Sikes
*Assistant Examiner*—Robert E. Wise
*Attorney, Agent, or Firm*—Blakely, Sokoloff, Taylor & Zafman

[57] ABSTRACT

An antenna in a transponder receives signals from a reader, modulates them, and reflects them back to a reader to pass the information contained in the transponder to the reader. The system includes a thin planar dielectric material having first and second opposite surfaces, preferably with the approximate dimensions of a credit card. First conductive material is disposed on the first surface of the dielectric member at a first end of the member. Second conductive material on the second opposite surface of the dielectric member at the second end of the member defines a dipole with the first material. The second material, preferably triangular in configuration, extends from the second end to a median position between the opposite ends. An electrical circuitry module on the dielectric member produces reflected signals modulated at a particular frequency from the signal transmitted by the reader to pass information contained in the transponder to the reader. The third conductive material on the second surface of the member is electrically coupled with the second conductive material and extends from the triangular apex toward the first end to enhance an impedance match between the dipole and electrical circuitry. The third material has a first low impedance portion split into two parts connected in parllel to provide an extended effective length in a relatively small distance, and has a second portion, preferably a "pigtail", of substantially higher impedance than the first portion connected in series with the first portion.

21 Claims, 1 Drawing Sheet

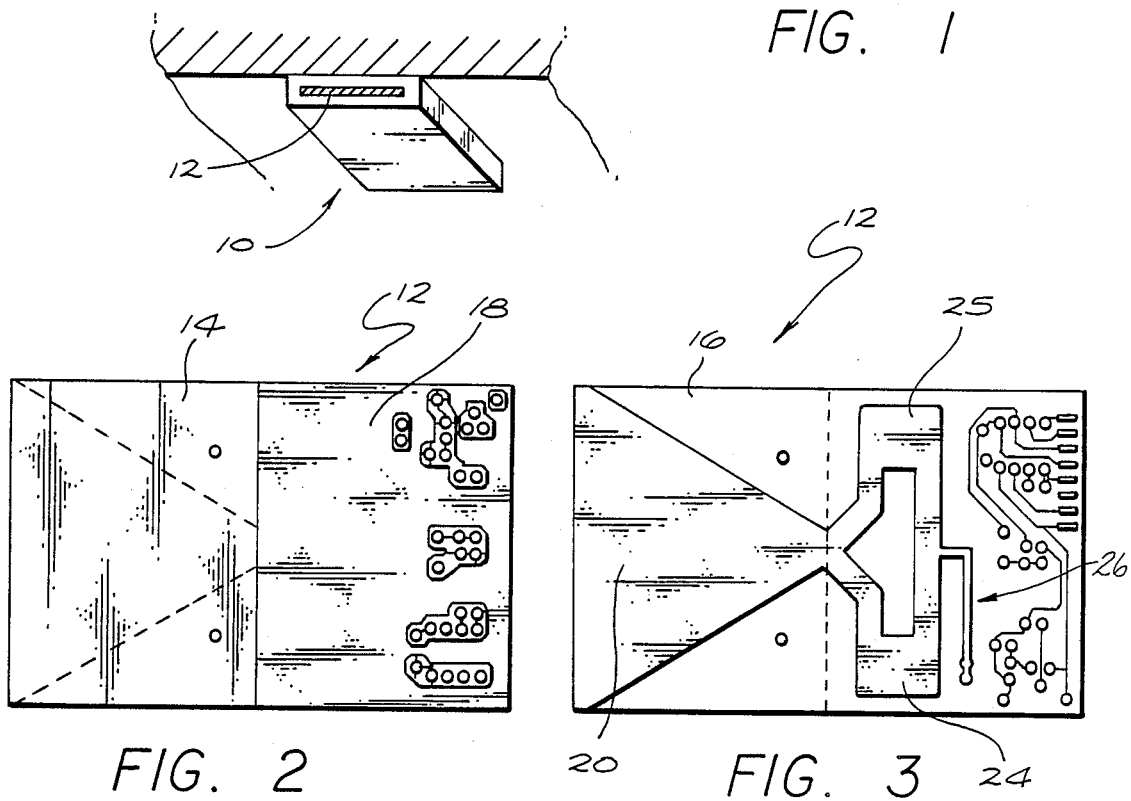
FIG. 1
FIG. 2
FIG. 3
FIG. 4
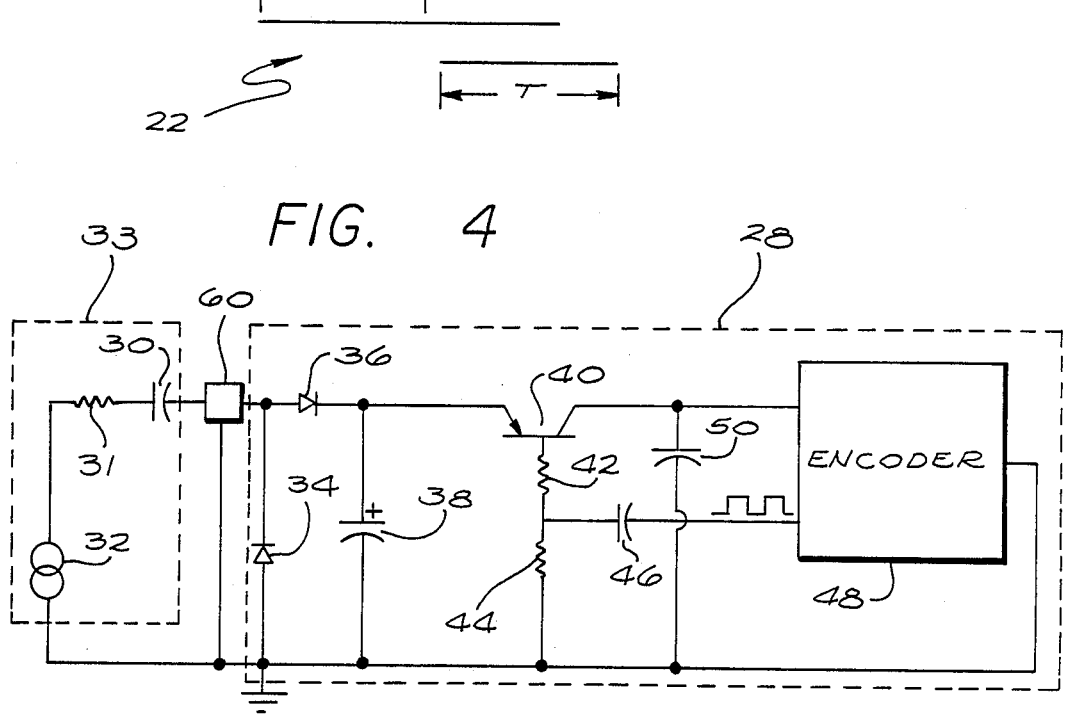
FIG. 5

TRANSPONDER ANTENNA

This invention relates to an antenna system in a transponder for modulating signals from a reader and for reflecting the modulated signals back to the reader to pass information from the transponder to the reader. The invention further relates to an antenna, preferably of credit card size, for transmitting such signals to a reader to identify the transponder at the reader and to pass other information contained in the transponder.

Systems are in use for identifying objects from a distance. For example, a considerable amount of cargo on a ship is stored in containers rather than being stored loosely in the ship. The containers on the ship are identified on a remote basis from a position on shore. The system for identifying such containers includes a transponder attached to the container on the ship and a reader on the shore. Each transponder has an individual code containing information related to and identifying the associated container. The reader interrogates the transponder. The transponder then modulates the interrogation signal and produces a sequence of signals in accordance with its individual code and reflects these signals to the reader. The reader decodes these signals to obtain the information from the transponder.

The signals received and modulated by the transponder and reflected to the reader are at a frequency prescribed by governmental authorities. To transmit these signals, an antenna is provided at the transponder. In the United States and Hong Kong, this frequency is approximately 915 megacycles. The antenna is preferably in the form of a dipole. The dipole is relatively large in order to provide for the transmission of signals at the prescribed frequency. For example, a suitable antenna for this purpose is disclosed and claimed in U.S. Pat. No. 4,782,345 filed in the United States Patent Office on July 29, 1986, and assigned to the assignee of this application.

Systems are now being developed for using the above identification systems to identify vehicles on automobile expressways as the vehicles pass through toll stations. Such systems will then automatically apply the toll costs at the toll station to the account of the vehicle owner. One advantage of such systems will be that the vehicles will be able to pass through the toll stations without stopping and with minimal delay. This will considerably enhance the flow of traffic through the toll stations, will reduce the need for personnel at the toll stations to receive payments of the tolls.

It is desirable for the transponders on the vehicles to be small, preferably the size f a credit card. In this way, the transponder can be carried by the vehicle owner in his or her wallet and be removed as he or she is passing a toll booth. Preferred transponders of this invention should be about 3" long and about 2" wide. They should also be relatively thin. It has not been easy to provide a satisfactory transponder with the size constraints discussed in the previous paragraph.

One serious problem has been that a dipole antenna cannot be easily constructed within such size constraints to transmit signals at a frequency of approximately 915 mhz. Problems result because each of the poles of the dipole must have a length considerably less than an optimal length of approximately ¼ wavelength, and there is an inadequate impedance match between the impedance of the resulting dipole antenna and the impedance of the electrical circuitry module in the transponder. A considerable effort has been made to provide a transponder to overcome these difficulties.

This invention provides a transponder which overcomes the above difficulties. The transponder is able to receive signals at the frequency of approximately 915 mhz with sufficient energy to modulate the received signal and to provide a reflected signal, containing the information in the transponder, to a reader at the toll station. The transponder includes an antenna preferably having a size corresponding to that of a credit card.

In one embodiment of the invention, an antenna system in a transponder modulates signals from a reader and reflects them back to pass to the reader the information contained in the transponder. The system includes a thin planar dielectric material having first and second opposite surfaces, preferably with dimensions of a credit card. A first conductive material is disposed on the first surface of the dielectric member at a first end of the member. Such material preferably has a rectangular configuration and extends approximately to a median position on the dielectric from a first end.

Second conductive material on the second opposing surface of the dielectric member at the second opposite end of the member defines a dipole with the first material. The second material is preferably triangular in configuration and extends from the second end approximately to a median position between the opposite ends. Preferably the triangular configuration is defined by a base extending substantially the width of the dielectric member at said second end and by an apex at the median position.

An electrical circuitry module on the dielectric member modulates the received signal to produce reflected signals at a particular frequency which pass to the reader to transmit the information in the transponder to the reader. A third conductive material on the second surface of the member is electrically coupled to the second conductive material and extends from the triangular apex toward the first end to enhance an impedance match between the dipole and the electrical circuitry module. The third material has a first low impedance portion comprised of two oppositely disposed parts coupled in parallel to provide an extended effective length in a relatively small distance between the first and second ends, and has a second pigtail-like higher impedance portion coupled in series with the first portion. The first portion converts the antenna impedance to a low value and the second pigtail-like portion converts the low impedance to the higher impedance of the electrical circuitry module.

In the drawings:

FIG. 1 illustrates a transponder covered and mounted to receive signals from a reader (not shown);

FIG. 2 is a top plan view illustrating the conductive pattern on a first side of a dielectric member included in the antenna assembly;

FIG. 3 is a bottom plan view illustrating the conductive pattern on the second side of the dielectric member included in the antenna assembly;

FIG. 4 is a simplified electrical diagram of an antenna formed by the conductive patterns on the first and second sides of the transponder assembly; and FIG. 5 is a schematic circuit diagram of electrical circuitry associated with the antenna in the transponder assembly.

In one embodiment of the invention, a packaged transponder assembly generally indicated at 10 includes a dielectric member 12. The dielectric member 12 may be made from thin suitable insulating material such as a fiberglass, the thickness being of the order of approximately 1/16". The dielectric member may have a length of about 3" and a width of about 2", dimensions corresponding substantially to those of a credit card. Preferably the components are surface mounted so that the packaged transponder is as thin as possible (like a credit card). The dielectric member may be provided with oppositely disposed parallel surfaces 14 and 16.

A conductive material 18 may be disposed on the surface 14. The conductive material 18 may be made from a thin sheet of a suitable material such as copper and this thin sheet may be covered with a suitable material for soldering such as a nickel solder. The conductive material 18 may cover approximately ½ of the area of the surface 14 at first end of the member 12. The conductive material 18 may be grounded.

Similarly, a conductive material 20 may be disposed on the opposite surface 16 of the dielectric member 12. The conductive material 20 may be formed from layers of copper and nickel in the same manner as the layer 18. The conductive material 20 may be disposed at a second end of the member 12 opposite the first end. The conductive material is preferably provided with a triangular configuration. The base of the triangle may extend substantially the width of the dielectric member 12, as shown. The apex of the triangle may be at approximately the median position between the opposite ends of the dielectric member 12.

The conductive materials 18 and 20 define a dipole generally indicated at 22 in FIG. 4. For optimal results, the lengths of each of the poles in the dipoles should be substantially ¼ of a wavelength at the frequency of operation of the antenna. In actuality, at a frequency of approximately 915 mhz, the combined lengths of the poles formed by the conductive materials 18 and 20 are less than 0.3 of a wavelength. The combined lengths of the poles in the antenna can be increased somewhat by forming the conductive material 20 in the triangular configuration discussed above. This results from the increased lengths defined by the sides of the triangle.

Electrically coupled to the apex of triangular conductive material 20 are a section of material consisting of two parts 24 and 25 connected in parallel, formed in the same manner as the material 20. The parallel connected conductive parts 24 and 25 together form a low impedance portion of the transmission line to increase the effective length of the conductive material 24 and 25 while restricting the actual distance occupied by the conductive material 24 and 25 in the direction between the first and second ends of the dielectric member 12. Conductive material parts 24 and 25 should extend in the direction between the first and second ends of the dielectric member 12 for as short a distance as possible, but may extend substantially the entire width of the dielectric member 12. The distance along the length of the dielectric member 12 may be approximately ¾".

A second, higher, impedance portion of the transmission line comprised of conductive materials 20, 24 and 25 may be a conductive pigtail 26 formed in the same manner as the material 20. The pigtail 26 is electrically coupled to the end of the two-part conductive material 24 and 25 away from triangle 20. The pigtail 26 extends initially in the longitudinal direction between the first and second ends of the dielectric member 12 at a median position between the opposite lateral sides of member 12, and then extends laterally. This also effectively limits the distance occupied by the pigtail 26 in the direction between the first and second ends of the member 12. This longitudinal distance may be approximately ¼". The lateral dimension of the pigtail 26 may be about 1". Conductive materials 24, 25 and 26 form a transmission line matching section with conductive material 18.

Referring to FIG. 5, the electrical circuitry in dotted box 28 is the electrical circuitry module attached to the end of the pigtail 26. The dipole antenna 33 generates an alternating voltage from the signal transmitted from the reader and includes capacitor 30 and resistor 31 in series with generator 32. The capacitor 30 and resistance 31 represent the impedance of the dipole antenna. An impedance matching section 60 connects the dipole antenna 33 to the electrical circuitry module 28. Conductive materials 18, 24, 25 and 26 form a transmission line matching section. Section 60 is coupled between capacitor 30 and the anode of diode 36, and is also grounded, as shown. The cathode of diode 34 is connected to the end of the matching section 60 and to the anode of diode 36. The anode of diode 34 is connected to the negative terminal of the generator 32 which is conductive pattern 18. This side of generator 32 is usually ground. A capacitor 38 is connected between the cathode of the diode 36 and the anode of the diode 34. Diodes 34 and 36 and capacitors 30 and 38 provide a voltage doubler rectifier.

A switching member such as a transistor 40 receives the voltage across the capacitor 38. The transistor 40 may be a pnp transistor such as a 2N3906. The transistor supplies power to the encoder 48. The encoder may be a CMOS circuit which operates at low voltages, such as approximately 2V, and low currents, such as 100 microamperes.

The emitter of the transistor 40 is common with the cathode of the diode 36, and the base of the transistor 40 is connected to the anode of the diode 34 through a pair of series resistances 42 and 44. A connection is made from one terminal of a capacitor 46 to the junction of resistors 42 and 44. The other terminal of capacitor 46 is connected to one terminal of encoder 48. A second terminal of encoder 48 is connected to the collector of the transistor 40 and a first terminal of capacitor 50. A third terminal of encoder 48 is common with the negative terminal of generator 32 and with the second terminal of capacitor 50.

The circuitry including transistor 40, encoder 48 and capacitor 46 is disclosed and claimed in co-pending application Ser. No. 885,250 filed by Alfred R. Koelle on July 14, 1986, for a "Transponder Useful in a System for Identifying Objects" and assigned to the assignee of record in this application. Although co-pending application Ser. No. 885,250 discloses a rectifier, the rectifier formed by capacitors 30 and 38 and diodes 34 and 36 operates in a somewhat different manner than the rectifier disclosed in the co-pending application.

When the transponder of the invention receives a signal from the reader, it produces an alternating voltage. In the positive half cycles of this alternating voltage, current flows through a circuit including generator 32, resistor 31, capacitor 30, diode 36 and capacitor 38. This current charges the capacitors 30 and 38. In the negative half cycles of the voltage, current flows through a circuit including generator 32, diode 34, resistor 31 and capacitor 30. As a result, a negative charge is produced on the left terminal of the capacitor 30. In the next positive half cycle, capacitor 30 is charged so that a positive charge is produced on the left terminal of the capacitor. The swing from the negative charge to a positive charge on the left terminal of capacitor 30 causes the charge produced on capacitor 38 to be effectively doubled. From a practical standpoint, a d.c. voltage of approximately 2V may be produced across capacitor 38.

Transistor 40 is designed to provide a current of approximately 100 microamperes when it receives an applied voltage of approximately 2V. The current through the transistor 40 is controlled at each instant by the binary code from the encoder 48. This code provides a sequence of binary "1's" and binary "0's" in a pattern individual to the transponder. When a binary "1" is produced in the encoder 48, the transistor 40 has a relatively low impedance so that a current of relatively large amplitude flows through the transistor. Upon the occurrence of a binary "0" in the encoder, the impedance of the transistor 40 is high such that a current of relatively low amplitude is produced in the transistor.

In one embodiment of the invention, the dipole 33 may have a resistive impedance of approximately 50 ohms and a capacitive impedance of approximately 50 ohms. This causes the effective impedance of the dipole to be approximately 75 ohms. The electrical circuitry 28 may have an effective impedance of approximately 30,000 ohms.

The conductive material 24 and 25 and the pigtail 26 which collectively form matching section 60 effectively provide an impedance match between the impedances of the dipole 33 and the electrical circuitry 28. The conductive material 24 and 25 provides a reduction of the impedance on the dipole 33 to a relatively low value such as approximately 4 or 5 ohms. The conductive material of pigtail 26 provides an increase in the impedance from this relatively low value to the impedance of the electrical circuitry 28.

The transponder of this invention is effective in receiving and reflecting signals from the reader in spite of several inherent disadvantages. One disadvantage is that the lengths of the poles in dipole 33 do not approach an optimal value of ¼ wavelength. Another disadvantage is that the transponder operates at relatively low power levels. In spite of these disadvantages, the transponder is able to obtain sufficient power transmitted from the reader to operate the transponder electronics. This results in part from the triangular configuration of the conductive material 20 increasing the effective length of the pole defined by this conductive material. It also results in part from the effectiveness of the split parallel-coupled configuration of the conductive material 24 and 25 in providing a relatively great effective length even though the length of the conductive material 24 and 25 on the dielectric member 12 between the first and second ends is relatively small. It additionally results from the operation of conductive material 24 and 25 and pigtail 26 in matching the relatively low impedance of the dipole 33 to the relatively high impedance of the circuitry 28. It further results from the operation of the rectifier formed by capacitors 30 and 38 and the diodes 34 and 36 in rectifying and doubling the voltage from the generator 32.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In a transponder which includes a dipole antenna, a signal-modulating module and an impedance-matching module for matching the impedance of said antenna to that of said signal-modulating module, the improvement comprising:
   a transmission line coupled between said dipole antenna and said impedance-matching module having a first portion having an impedance lower than that of said dipole antenna and a predetermined width comprised of two oppositely disposed parts connected in parallel, and a second substantially narrower portion with substantially higher impedance than the impedance of said first portion, connected in series with said first portion.

2. The transponder as set forth in claim 1 wherein said first portion of said impedance matching module is connected to said antenna and said second portion is connected to said signal-modulating module.

3. The transponder as set forth in claim 1 wherein said impedance matching module is designed to increase the voltage of the received signal to a voltage sufficient to power the signal-modulating module.

4. The transponder as set forth in claim 1 wherein said antenna is adapted to receive transmitted signals from a reader to produce an alternating voltage, and
   wherein said antenna further includes a means connected to said second portion of said impedance-matching module for converting the alternating voltage from the received signal to a d.c. voltage used for powering the modulation of reflected signals back to a reader.

5. In combination in an antenna in a transponder for transmitting signals to a reader containing information from the transponder,
   a planar dielectric member having first and second opposed surfaces,
   first conductive material on the first surface of the dielectric member at one end of the dielectric member,
   second conductive material on the second opposed surface of the dielectric member at the other end of the dielectric member,
   the first and second conductive materials being separated from each other in the direction between the first and second ends of the dielectric member by a distance to define a dipole having a first impedance,
   a split conductive path extending from the end of the second conductive material nearer to the first conductive material to a portion over the first conductive material, the split conductive path defining a second impedance less than the impedance of the dipole antenna at the junction with the second conductive material, and
   a pigtail extending from the split conductive path and defining a third impedance greater than the second impedance.

6. In a combination as set forth in claim 5,
   means connected to the pigtail for providing for a transmission of signals by the dipole antenna at a particular frequency, such means providing an impedance greater than the first impedance.

7. In accordance as set forth in claim 5,
   means for providing an alternating voltage, means connected to the pigtail for rectifying the alternating voltage and for grounding the first conductive material.

8. In a combination as set forth in claim 5,
the dipole receiving signals from a reader to produce an alternating voltage,
means connected to the pigtail for rectifying the alternating voltage to produce a d.c. voltage having a magnitude approximately double the amplitude of the altnernating voltage and for grounding the first conductive material, and
means connected to the rectifying means and energized by the rectifying means for providing for the modulation of reflected signals by the dipole antenna at a particular frequency, such means providing an impedance greater than the first impedance.

9. In a combination as set forth in claim 8,
the rectifying means including a distributed capacitor formed between the first and second conductive materials.

10. In a combination as set forth in claim 9,
the second conductive material having a triangular configuration.

11. In combination in an antenna in a transponder for transmitting signals to a reader to pass information contained in the transponder at the reader,
a planar dielectric member having first and second opposite surfaces,
a first conductive material on the first surface of the dielectric member, the first conductive material covering substantially one half of the surface area of the first surface at one end of the first surface and having a substantially planar configuration,
a second conductive material on the second surface of the dielectric at a second end of the second surface opposite the first conductive material on the first surface, the second conductive material having substantially a triangular configuration and being separated from the first conductive material in the direction between the first and second ends by a distance to define a dipole with the first conductive material.

12. In a combination as set forth in claim 11,
the triangular configuration of the second conductive material having a width corresponding substantially to the width of the dielectric member at the second end of the dielectric member and having an apex at a position substantially median between the first and second ends of the dielectric material.

13. In a combination as set forth in claim 12,
the first conductive material being grounded.

14. In a combination as set forth in claim 12,
means disposed on the dipole and connected to the rectifying means for providing for transmission of signals as a particular frequency by the dipole.

15. In a combination as set forth in claim 11,
means for providing an alternating voltage to the dipole, and
means disposed on the dielectric material and connected to the dipole for grounding the first conductive material, for rectifying the alternating voltage and for increasing the magnitude of the rectified voltage above the peak amplitude of the alternating voltage.

16. In combination in an antenna in a transponder for receiving signals from a reader and for modulating and reflecting said signals back to the reader to pass information from the transponder to the reader,
a planar dielectric member having first and second opposite surfaces,
a first conductive material on the first surface of the dielectric member at a first end of the dielectric member,
a second conductive material on the second surface of the dielectric member at a second end of the dielectric member opposite the first end of the dielectric member to define a dipole with the first conductive material,
the lengths of each of the first and second opposed ends of the dielectric material defining less than a quarter of a wavelength at the frequency at which the dipole is to be operated, and
means disposed on the dielectric material and electrically contiguous with the second conductive material for reducing the capacitive impedance of the antenna to compensate for the additional capacitive impedance resulting from the length of each of the first and second conductive materials being less than a ¼ of a wavelength.

17. In combination as set forth in claim 16,
the dielectric member being about credit card size.

18. In a combination as set forth in claim 16,
the second conductive material being shaped to increase the effective length of the second conductive material as one of the poles in the dipole.

19. In a combination as set forth in claim 16,
means defining electrical circuitry and disposed on the dielectric member for receiving signals from the reader and for providing for the transmission of signals by the dipole to the reader, and
a third electrically conductive material disposed on the second surface of the dielectric member in electrically contiguous relationship with the second conductive material and connected to the electrical circuitry means for enhancing the impedance match between the impedances of the dipole and the electrical circuitry means.

20. In a combination as set forth in claim 19,
the third electrically conductive material including a first portion extending from the second portion having two parallel-coupled parts to provide the first portion with an extended effective length in a relatively small distance in the direction between the first and second ends of the dielectric member, and including a second portion extending from the first portion and defining a pigtail.

21. In a combination as set forth in claim 20,
the second conductive material having a triangular configuration defined by a base extending substantially the width of the dielectric member and having an apex at a median position between the first and second ends of the dielectric member, and
the first portion of the third conductive material providing a conversion of the impedance of the dipole to a relatively low value and the second portion of the third conductive material providing a conversion of the relatively low impedance from the first portion to the impedance of the electrical circuitry means.

* * * * *